(12) United States Patent
Yuan

(10) Patent No.: US 12,021,270 B2
(45) Date of Patent: Jun. 25, 2024

(54) BATTERY CELL MODULE AND BATTERY PACK

(71) Applicant: Dongguan Poweramp Technology Limited, Dongguan (CN)

(72) Inventor: Hongwei Yuan, Dongguan (CN)

(73) Assignee: DONGGUAN POWERAMP TECHNOLOGY LIMITED, Guangdong (CN)

( * ) Notice: Subject to any disclaimer, the term of this patent is extended or adjusted under 35 U.S.C. 154(b) by 507 days.

(21) Appl. No.: 17/219,832

(22) Filed: Mar. 31, 2021

(65) Prior Publication Data

US 2022/0021091 A1    Jan. 20, 2022

Related U.S. Application Data

(63) Continuation of application No. PCT/CN2020/102790, filed on Jul. 17, 2020.

(51) Int. Cl.
| | |
|---|---|
| *H01M 50/586* | (2021.01) |
| *H01M 50/204* | (2021.01) |
| *H01M 50/242* | (2021.01) |
| *H01M 50/502* | (2021.01) |
| *H01M 50/54*  | (2021.01) |
| *H01M 50/593* | (2021.01) |

(52) U.S. Cl.
CPC ....... *H01M 50/586* (2021.01); *H01M 50/204* (2021.01); *H01M 50/242* (2021.01);
(Continued)

(58) Field of Classification Search
CPC .......... H01M 10/6235; H01M 50/593; H01M 50/242; H01M 50/54; H01M 50/586;
(Continued)

(56) References Cited

U.S. PATENT DOCUMENTS

| | | | |
|---|---|---|---|
| 2011/0076521 A1 | 3/2011 | Shimizu et al. | |
| 2018/0309110 A1* | 10/2018 | Iwasaki | ............... H01M 50/557 |
| 2020/0358060 A1* | 11/2020 | Sauerteig | ............. H01M 50/211 |

FOREIGN PATENT DOCUMENTS

| | | |
|---|---|---|
| CN | 204596909 U | 8/2015 |
| CN | 205122683 U | 3/2016 |

(Continued)

OTHER PUBLICATIONS

International Search Report and Written Opinion, PCT/CN2020/102790, dated Apr. 19, 2021, 8 pgs.—No. English Translation Available—.

(Continued)

*Primary Examiner* — Mayla Gonzalez Ramos
*Assistant Examiner* — Bethany C Garcia
(74) *Attorney, Agent, or Firm* — Morgan, Lewis & Bockius LLP

(57) ABSTRACT

A battery cell module includes a plurality of stacked battery cells, a collection member, and a bracket. The battery cell includes tabs and a cell body; and the collection member is connected to the tabs; where in two adjacent battery cells, a first battery cell includes a first tab and a second tab, the second battery cell includes a third tab and a fourth tab, and the first tab is connected to the third tab. The bracket includes a fixing plate and a first barrier provided on the fixing plate, where the collection member is provided between the fixing plate and the cell body; and the first barrier is provided between the second tab of the first battery cell and the fourth tab of the second battery cell.

19 Claims, 7 Drawing Sheets

(52) U.S. Cl.
CPC ......... *H01M 50/502* (2021.01); *H01M 50/54* (2021.01); *H01M 50/593* (2021.01); *H01M 2220/30* (2013.01)

(58) Field of Classification Search
CPC ........... H01M 50/502; H01M 2220/30; H01M 50/211; H01M 50/204; H01M 50/20; H01M 50/178; H01M 50/247; H01M 50/503; H01M 50/55; H01M 50/557; H01M 50/566; H01M 10/0436; H01M 10/647; H01M 50/507; H01M 50/209; H01M 50/291; H01M 50/271; H01M 50/50; H01M 50/172; H01M 50/258; H01M 10/6554; Y02E 60/10; Y02P 70/50
See application file for complete search history.

(56) References Cited

FOREIGN PATENT DOCUMENTS

| | | |
|---|---|---|
| CN | 205882078 U | 1/2017 |
| CN | 209860094 U | 12/2019 |
| CN | 210092187 U | 2/2020 |
| CN | 210129547 U | 3/2020 |
| CN | 110993873 A | 4/2020 |
| CN | 111009625 A | 4/2020 |
| CN | 111403637 A | 7/2020 |
| DE | 102017219316 A1 | 5/2019 |
| EP | 2693516 A1 | 2/2014 |
| EP | 3154108 A1 | 4/2017 |
| EP | 3886239 A1 | 9/2021 |
| JP | 2019186037 A | 10/2019 |
| WO | WO2020/037535 A1 | 2/2020 |

OTHER PUBLICATIONS

Ningde Amperex Technology Ltd, Extended European Search Report, EP20866913.5, dated Oct. 29, 2021, 7 pgs.

Dongguan Poweramp Technology Limited, International Search Report, PCT/CN2020/102790, dated Apr. 19, 2021, 5 pgs.

Dongguan Poweramp Technology Limited, Extended European Search Report, EP20866917.6, dated Nov. 15, 2021, 6 pgs.

\* cited by examiner

BATTERY CELL MODULE AND BATTERY PACK

CROSS REFERENCE TO THE RELATED APPLICATIONS

This application is a continuation application of PCT Patent Application No. PCT/CN2020/102790, entitled "BATTERY CELL MODULE AND BATTERY PACK" filed on Jul. 17, 2020, which is incorporated herein by reference in its entirety.

TECHNICAL FIELD

This application relates to the field of electrochemical apparatus technologies, and in particular, to a battery cell module and a battery pack.

BACKGROUND

Power tools such as robotic vacuum cleaners and circular saw cutting machines are getting increasingly popular among people. In existing battery packs, an adapter plate is usually connected to a tab on a battery cell, and the adapter plate collects voltage. However, the adapter plate occupies a relatively large battery space. To reduce an overall volume of the battery, the adapter plate is generally replaced with a flexible circuit board to resolve the problem of space utilization. However, a robotic vacuum cleaner or a circular saw cutting machine vibrating strongly or in other situations may cause unconnected tabs to come into contact, leading to a short circuit.

SUMMARY

In view of this, it is necessary to provide a battery cell module and a battery pack, to prevent unconnected tabs on adjacent battery cells from coming into contact.

This application provides a battery cell module, and the battery cell module includes a plurality of stacked battery cells, a collection member, and a bracket. Each battery cell includes tabs and a cell body; and the collection member is connected to the tabs; and in two adjacent battery cells, a first battery cell includes a first tab and a second tab, the second battery cell includes a third tab and a fourth tab and the first tab is connected to the third tab. The bracket includes a fixing plate and a first barrier provided on the fixing plate, where the collection member is provided between the fixing plate and the cell body; and the first barrier is provided between the second tab of the first battery cell and the fourth tab of the second battery cell.

In at least one implementation, the bracket further includes a second barrier provided on the fixing plate, and the fixing plate, the first barrier, and the second barrier form a first accommodating groove; a third battery cell is provided on a side of the second battery cell, the third battery cell includes a fifth tab and a sixth tab, the fourth tab is connected to the sixth tab, and the fifth tab extends in a direction away from the third tab; and the fourth tab and the sixth tab are accommodated in the first accommodating groove, and the fourth tab and the sixth tab are connected to the collection member.

In at least one implementation, a first insulation member is provided between the fourth tab and the sixth tab.

In at least one implementation, the bracket further includes a third barrier provided on the fixing plate, the first barrier is located between the second barrier and the third barrier, the fixing plate, the third barrier, and the first barrier form a second accommodating groove, and a second insulation member is provided in the second accommodating groove.

In at least one implementation, at least one of the first barrier, the second barrier, and the third barrier includes an insulation structure.

In at least one implementation, the battery cell module further includes a connection member, an end of the connection member is connected to the battery cell, the other end of the connection member extends along a surface of the fixing plate away from the collection member, and the fixing plate is provided with a groove for accommodating the collection member.

In at least one implementation, the battery cell module further includes a blocking panel, the blocking panel is provided with an opening, and the other end of the collection member extends through the opening.

In at least one implementation, a restraint member is provided at an opening location, and the restraint member is configured to restrain the connection member.

In at least one implementation, the battery cell module further includes an adapting member, where the adapting member includes a connection portion and an adapting end, an end of the connection portion is connected to the collection member, the other end of the connection portion is connected to the adapting end, the blocking panel is further provided with a through hole, and the adapting end extends through the through hole.

In at least one implementation, the battery cell module further includes a third insulation member, and the third insulation member is provided between adjacent battery cells.

In at least one implementation, the first tab, the fourth tab, and the fifth tab are positive tabs, the second tab, the third tab, and the sixth tab are negative tabs, and the plurality of battery cells are connected in series.

A battery pack is provided, including the battery cell module according to any one of the foregoing implementations and a housing, and the battery cell module is accommodated in the housing.

In the battery cell module provided in this application, the bracket is provided, where the bracket includes the first barrier, and the first barrier is provided between the second tab and the fourth tab of the adjacent battery cells, to electrically separate the unconnected second tab and fourth tab, thereby preventing the unconnected second tab and fourth tab from coming into contact and causing a short circuit.

REFERENCE SIGNS OF MAIN COMPONENTS

Figure 1:
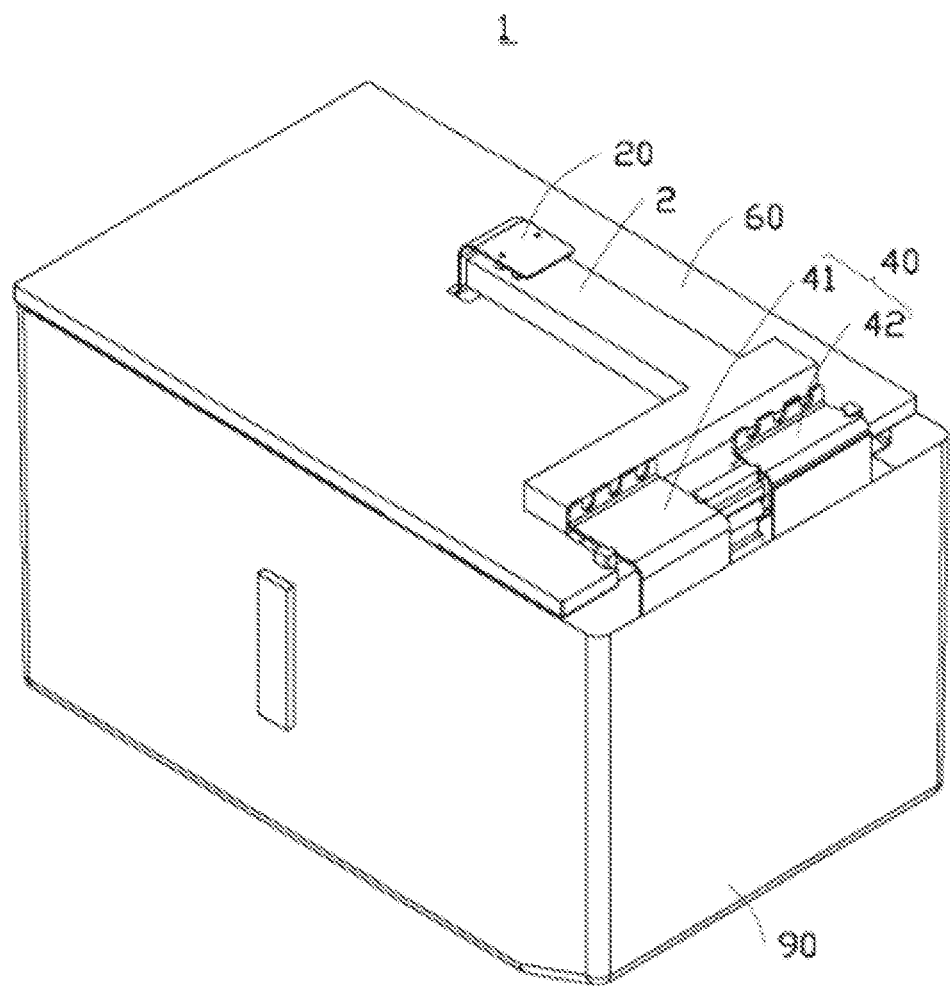
FIG. 1 is a three-dimensional schematic diagram of a battery cell module according to an implementation.

Battery cell module 1
Battery cell 10
First battery cell A
Second battery cell B
Third battery cell C
Cell body 11
First tab 12
Second tab 13
Third tab 14
Fourth tab 15
Fifth tab 16
Sixth tab 17
Collection member 20
Body portion 21
Collection plate 22
Adapting member 25
Connection portion 252
Adapting end 251
Electrical connector 253
Bracket 30
Fixing plate 31
Groove 311
First barrier 32
Second barrier 33
First accommodating groove 34
Third barrier 35
Second accommodating groove 36
Connection member 40
First connection member 41
Security zone 411
Second connection member 42
Barrier plate 50
Blocking panel 60
Panel body 61
Opening 62
Restraint member 63
Through hole 64
First insulation member 70
Second insulation member 71
Third insulation member 72
Insulation plate 80
Adhesive 90
Circuit board 2

DETAILED DESCRIPTION OF EMBODIMENTS

The following describes the technical solutions in the embodiments of this application with reference to the accompanying drawings in the embodiments of this application. Apparently, the described embodiments are merely some but not all of the embodiments of this application.

It should be noted that when considered to be "connected" to another component, a component may be directly connected to the another component or an intermediate component may exist. When considered to be "provided" on another component, a component may be directly provided on the another component or an intermediate component may exist at the same time. Terms such as "top", "bottom", "upper", "lower", "left", "right", "front", "rear" and similar expressions used herein are only for description purposes.

Unless otherwise defined, all technical and scientific terms used herein shall have the same meanings as commonly understood by persons skilled in the art to which this application belongs. The terms used herein in this specification of this application are only used to describe specific embodiments, and are not intended to limit this application.

A battery cell module is provided, and includes a plurality of stacked battery cells, a collection member, and a bracket. The battery cell includes tabs and a cell body; and the collection member is connected to the tabs, where in two adjacent battery cells, a first battery cell includes a first tab and a second tab, the second battery cell includes a third tab and a fourth tab, and the first tab is connected to the third tab. The bracket includes a fixing plate and a first barrier provided on the fixing plate, where the collection member is provided between the fixing plate and the cell body; and the first barrier is provided between the second tab of the first battery cell and the fourth tab of the second battery cell.

The foregoing battery cell module is used as an example. The bracket is disposed on the battery cell module, the bracket includes a first barrier, and the first barrier is provided between the unconnected second tab and fourth tab of the adjacent battery cells. That is, even if the battery cell module is intensively vibrated, by using the first barrier, the unconnected tabs of the adjacent battery cells may be prevented from coming into contact and causing a short circuit because of vibration or another condition.

Referring to FIG. 1 FIG. 2, FIG. 4, and FIG. 6 a battery cell module 1 includes a plurality of battery cells 10, a collection member 20, and a bracket 30. The plurality of battery cells 10 are stacked. The battery cell 10 includes a cell body 11 and tabs connected to the cell body 11. The collection member 20 is connected to the tabs. In two adjacent battery cells 10, a first battery cell A includes a first tab 12 and a second tab 13, the second battery cell B includes a third tab 14 and a fourth tab 15, and the first tab 12 is connected to the third tab 14. The bracket 30 includes a fixing plate 31 and a first barrier 32 provided on the fixing plate 31, where the collection member 20 is disposed between the fixing plate 31 and the cell body 11; and the first barrier 32 is disposed between the second tab 13 of the first battery cell A and the fourth tab 15 of the second battery cell B.

In this implementation, the collection member 20 is a flexible circuit board. It may be understood that, in another implementation, the collection member 20 may also be replaced with another structure with an equivalent usage or function, such as a collection terminal.

Figure 2:
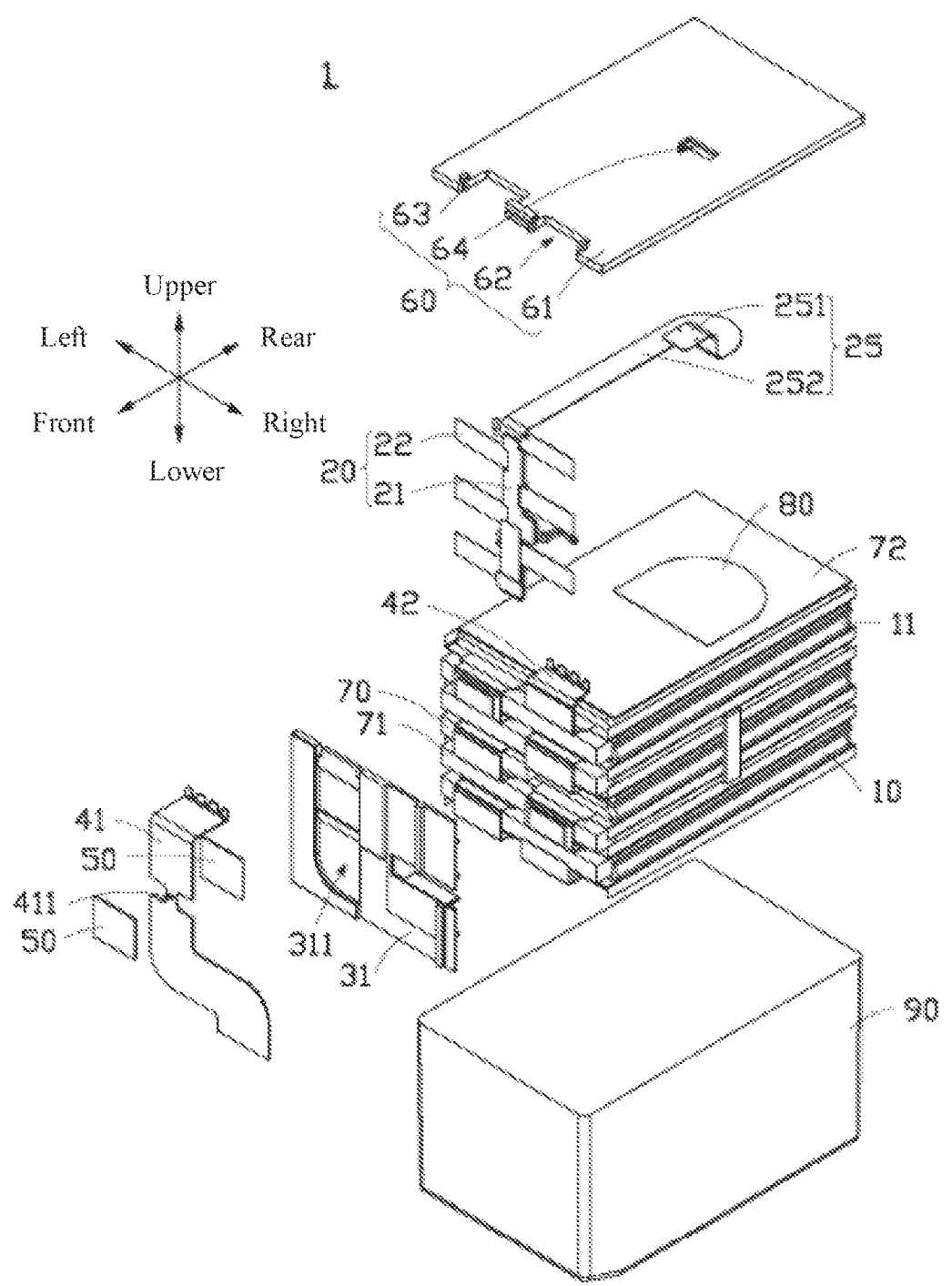
FIG. 2 is an exploded schematic view of the battery cell module shown in FIG. 1.
Figure 3:
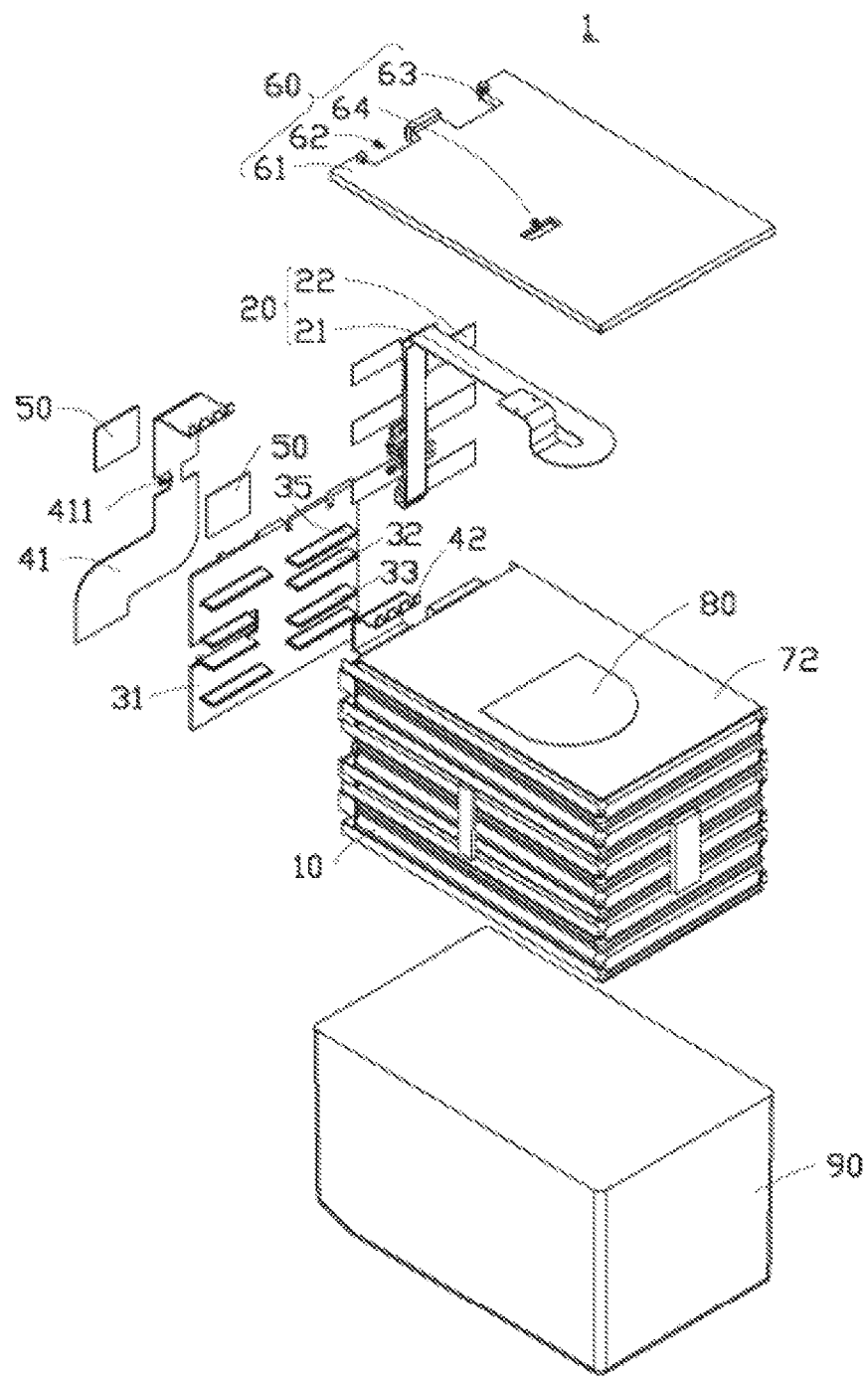
FIG. 3 is an exploded schematic view of the battery cell module shown in FIG. 2 from another perspective.
Figure 4:
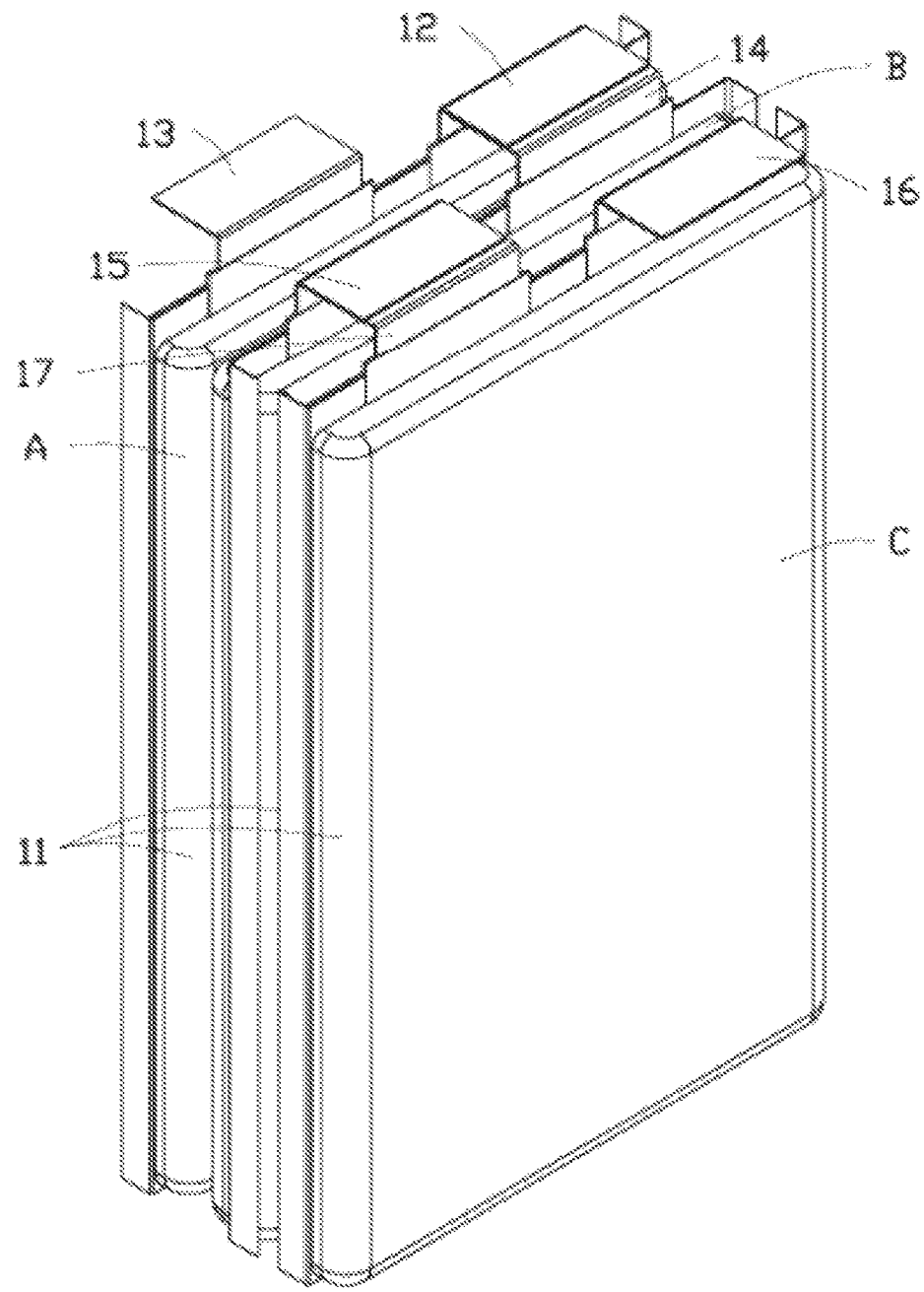
FIG. 4 is a schematic structural diagram of two adjacent battery cells.

Referring to FIG. 2, FIG. 3, and FIG. 4, the plurality of battery cells 10 are stacked in a preset direction. In an implementation, the battery cells 10 are disposed in a direction from top to bottom. The battery cell 10 includes the cell body 11 and tabs. In this implementation, the two adjacent battery cells 10 are described. The two adjacent battery cells include a first battery cell A and a second battery cell B. The first battery cell A and the second battery cell B include cell bodies 11, and the first battery cell A further includes a first tab 12 and a second tab 13 provided on the cell body 11. The second battery cell B further includes a third tab 14 and a fourth tab 15 provided on the cell body 11. A third battery cell C is further provided on a side of the second battery cell B away from the first battery cell A. The third battery cell C includes a cell body 11 and a fifth tab 16 and a sixth tab 17 provided on the cell body 11. The cell body 11 is formed by winding or laminating two electrode plates after a separator is provided therebetween. Such technical content is relatively frequently used in existing battery structures, and is not repeated herein.

In an implementation, the first tab 12, the fourth tab 15, and the fifth tab 16 are positive tabs, and the second tab 13, the third tab 14, and the sixth tab 17 are negative tabs. It may be understood that, in another implementation, polarities of the first tab 12 may be exchanged with polarities of the second tab 13, the fourth tab 15 may be exchanged with polarities of the third tab 14, and the fifth tab 16 may be exchanged with polarities of the sixth tab 17. Between the adjacent battery cells 10, tab on one battery cell 10 and tab on the other battery cell 10 are provided on the same side of their respective cell bodies 11, and the tabs are connected to connect a plurality of the battery cells 10. Specifically, the first tab 12 of the first battery cell A is connected to the third tab 14 of the second battery cell B, the fourth tab 15 of the second battery cell B is connected to the sixth tab 17 of the third battery cell C, and the fifth tab 16 extends away from the third tab 14. A plurality of other battery cells 10 are connected in the same manner to realize the foregoing serial connection of the plurality of the battery cells 10. In this implementation, the first tab 12 and the third tab 14 are connected through welding, and the fourth tab 15 and the sixth tab 17 are connected through welding.

Referring to FIG. 2 and FIG. 3, the collection member 20 is disposed on a side of the battery cell 10 on which the tabs are provided. The collection member 20 includes a body portion 21 and a collection plate 22 provided on the body portion 21, and the tabs on the adjacent battery cells 10 are stacked with and then connected to the collection plate 22, to collect a voltage. In an implementation, the tabs are welded to the collection plate 22.

It may be understood that, in another implementation, the tabs may also be connected to the collection plate 22 in another manner. For example, the tabs are locked onto the collection plate 22 by using a screw.

A plurality of the collection plates 22 are provided on the body portion 21, and two adjacent collection plates 22 perpendicular to the body portion 21, and two adjacent collection plates 22 extend in opposite directions, so that the collection plates 22 are connected to first tabs 12, second tabs 13, third tabs 14, fourth tabs 15, fifth tabs 16, and sixth tabs 17 on different battery cells 10.

Referring to FIG. 2 and FIG. 3, in an implementation, the battery cell module 1 further includes an adapting member 25. The adapting member 25 includes a connection portion 252 and an adapting end 251. An end of the connection portion 252 is connected to the body portion 21 of the collection member 20, and the other end of the connection portion 252 is connected to the adapting end 251.

The connection portion 252 is roughly perpendicular to the body portion 21, and the connection portion 252 is provided along a surface of the cell body 11, to reduce an overall volume of the battery cell module 1.

An electrical connector 253 is also provided on the adapting end 251, so that the collection member 20 can be connected to an external electrical connection member, such as an external circuit board 2.

It may be understood that, in another implementation, the adapting member 25 and the collection member 20 may be an integrally formed structure. Similarly, the collection member 20 may be connected to an external electrical connection member.

Figure 5:
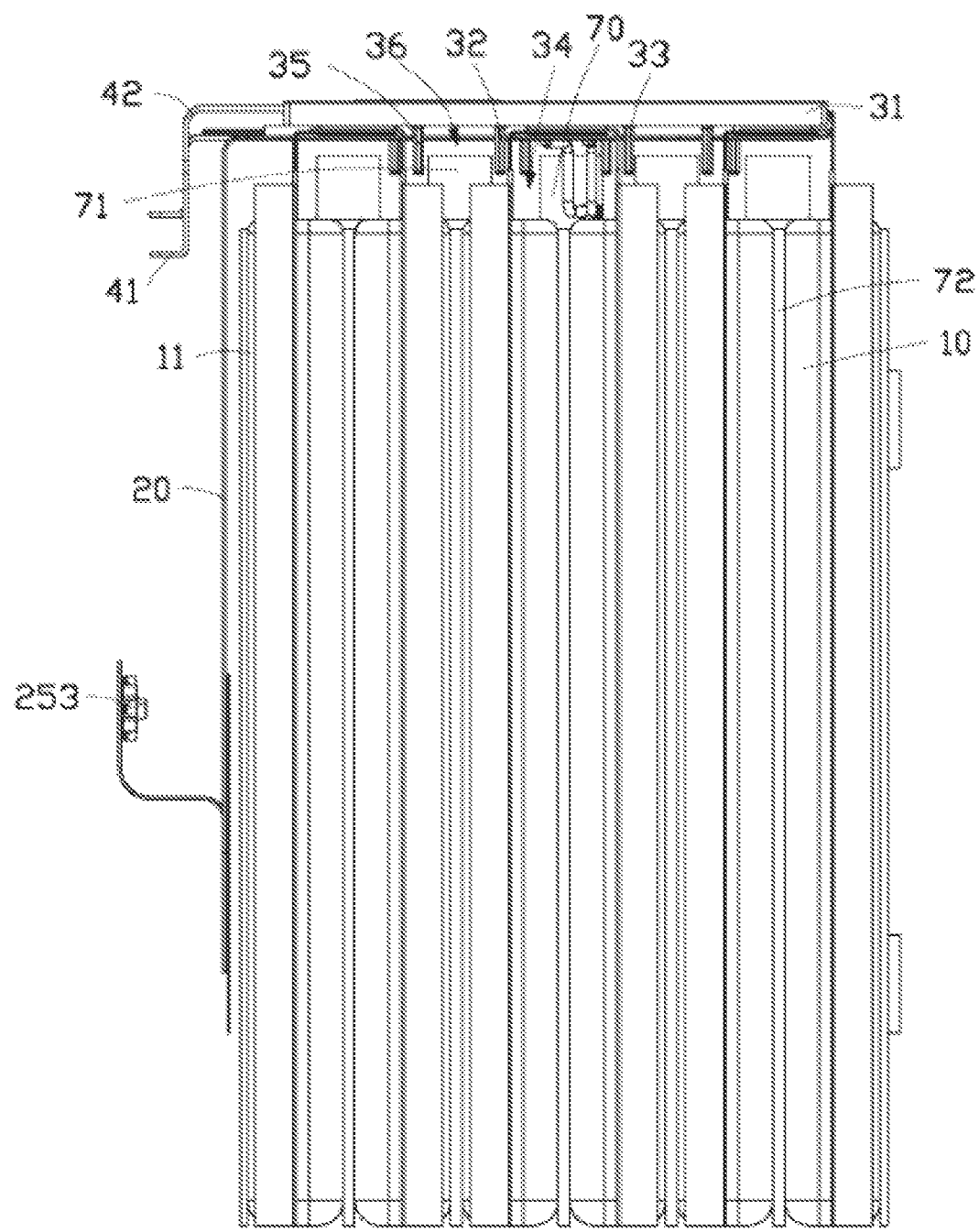
FIG. 5 is a three-dimensional schematic diagram of the bracket, the flexible circuit board, and the battery cell shown in FIG. 3 from a side perspective.
Figure 6:
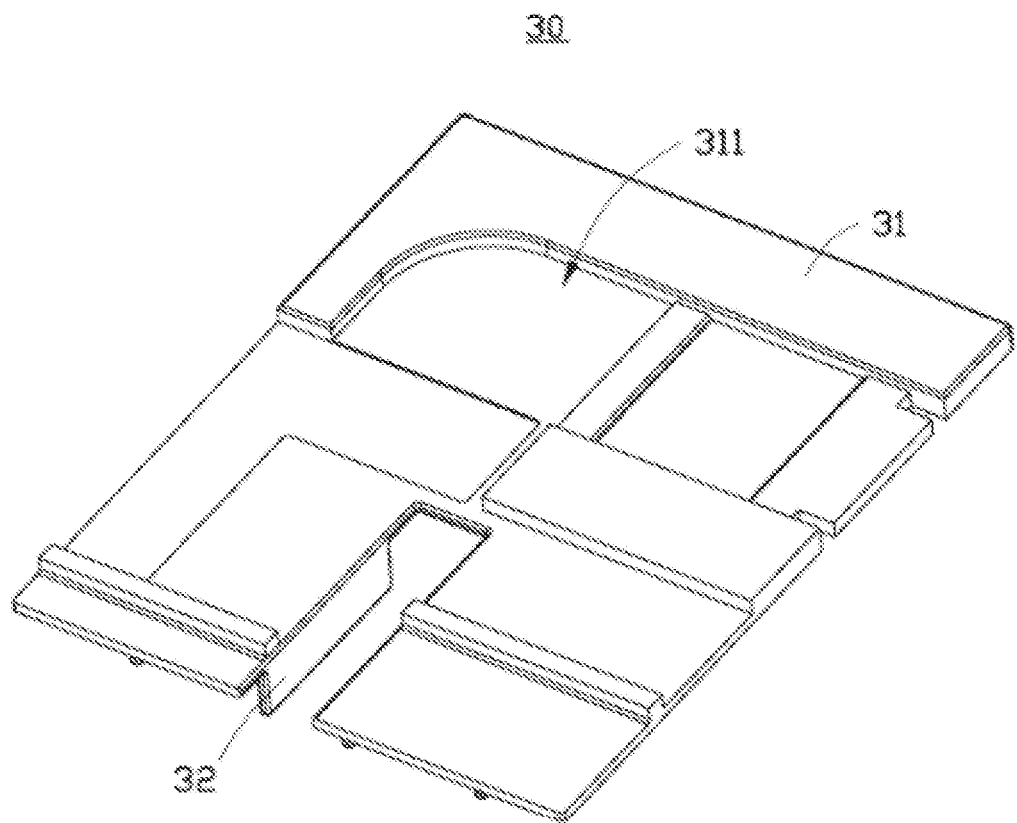
FIG. 6 is a three-dimensional schematic diagram of a bracket.

Referring to FIG. 3, FIG. 5, and FIG. 6, the bracket 30 and the collection member 20 are provided on the same side of the battery cell 10, and the bracket 30 is provided on a side of the collection member 20 away from the battery cell 10. The bracket 30 includes a fixing plate 31 and a first barrier 32 provided on the fixing plate 31, and the first barrier 32 extends toward the battery cell 10. Further, the first barrier 32 is a stop plate.

A groove 311 is provided on a surface of the fixing plate 31 away from the first barrier 32, and the groove 311 is configured to accommodate another structure.

In an implementation, the first barrier 32 is provided between the second tab 13 and the fourth tab 15 of the adjacent first battery cell A and second battery cell B, so that the unconnected second tab 13 and fourth tab 15 are electrically separated to avoid a short circuit.

In an implementation, the bracket 30 further includes a second barrier 33, and the second barrier 33 is provided on the fixing plate 31. The fixing plate 31, the first barrier 32, and the second barrier 33 form a first accommodating groove 34. The fourth tab 15 and the sixth tab 17 are accommodated in the first accommodating groove 34.

In an implementation, the bracket 30 further includes a third barrier 35, where the third barrier 35 is also provided on the fixing plate 31, and the first barrier 32 is located between the third barrier 35 and the second barrier 33. The fixing plate 31, the third barrier 35, and the first barrier 32 form a second accommodating groove 36, and the third barrier 35 and the first barrier 32 can jointly separate the unconnected second tab 13 and fourth tab 15 of the adjacent first battery cell A and second battery cell B, to more effectively prevent the unconnected second tab 13 and fourth tab 15 from coming into contact.

At least one of the first barrier 32, the second barrier 33, and the third barrier 35 includes an insulation structure (not shown). In this embodiment, the fixing plate 31, the first barrier 32, the second barrier 33, and the third barrier 35 are integrally formed from plastic. In another embodiment, the first barrier 32 may be made of an uninsulated material. To electrically separate the unconnected tabs and avoid the short circuit, the first barrier 32 may be coated with an insulation material or an insulation member may be provided on the barrier. Similarly, the second barrier 33 and the third barrier 35 may also be provided in this manner. In addition, an insulation member may be added between the tab and the first barrier 32 for electrical separation.

It may be understood that, in another implementation, a plurality of first barriers 32 and second barriers 33 may be provided on the bracket 30 to accommodate the connected tabs and the collection plates 22. A plurality of third barriers 35 may also be provided on the bracket 30 to cooperate with the first barrier 32 to jointly separate the unconnected second tab 13 and fourth tab 15 of the adjacent battery cells 10.

In another implementation, it is possible that a second tab 13 of one first battery cell A is separated from a fourth tab 15 of a second battery cell B adjacent to the first battery cell A by providing only the first barrier 32. Such setting can make the bracket 30 simpler and have a lighter overall structure.

Referring to FIG. 2 and FIG. 3, the battery cell module 1 further includes a connection member 40, and the connection member 40 is connected to a tab of the battery cell 10. The connection member 40 includes a first connection member 41 and a second connection member 42. An end of the first connection member 41 is connected to the tab and the collection plate 22 at a lowest end of the battery cell 10, and the other end extends toward an upper end of the battery cell 10. The first connection member 41 is accommodated in the groove 311 of the bracket 30, to prevent the first connection member 41 from shaking during highly intensive vibration. In addition, the bracket 30 also plays a role of supporting the first connection member 41. An end of the second connection member 42 is connected to the tab and the collection plate 22 at the upper end of the battery cell 10, and the other end extends away from the upper end of the battery cell 10. The first connection member 41 is connected to a positive tab on the battery cell 10, and the second connection member 42 is connected to a negative tab on the battery cell 10. It may be understood that, in another implementation, polarities of the tabs connected to the first connection member 41 and the second connection member 42 may be exchanged.

The first connection member 41 is provided with a security zone 411. When a current is greater than a preset current, the first connection member 41 is disconnected in the security zone 411, thereby the current disconnected and preventing a dangerous situation. In this case, the first connection member 41 in the security zone 411 is equivalent to a fuse, thereby improving safety of a soft-packaged module of the battery cell 10.

To prevent high temperature from affecting the bracket 30 if the first connection member 41 is disconnected in the security zone 411, a barrier plate 50 is provided in the security zone 411. Further, two barrier plates 50 are provided in the security zone 411, and the two barrier plates 50 are attached to two opposite surfaces of the first connection member 41, to insulate the first connection member 41 in the security zone 411 from heat.

In an implementation, after extending toward the battery cell 10 close to the rightmost side, the first connection member 41 is located on the same side of the battery cell 10 as the other end of the second connection member 42, which can reduce an occupancy volume required when the first connection member 41 and the second connection member 42 extend out, thereby reducing the overall volume of the battery cell module 1.

Figure 7:
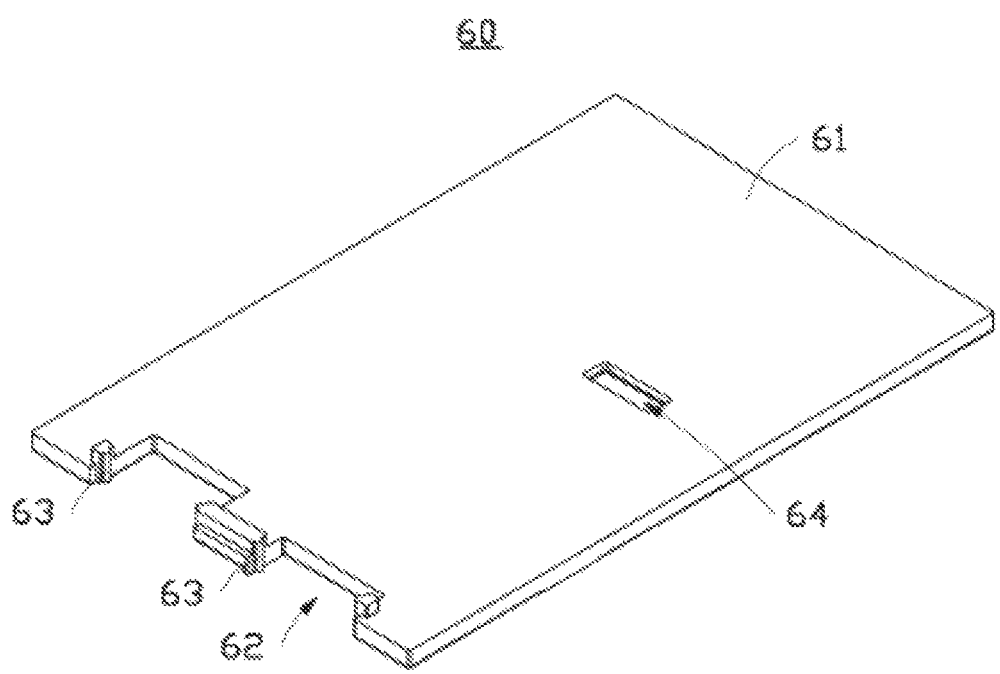
FIG. 7 is a three-dimensional schematic diagram of a blocking panel.

Referring to FIG. 7, the battery cell module 1 further includes a blocking panel 60. The blocking panel 60 is provided on an outer surface of the battery cell 10, to protect the battery cell 10. The blocking panel 60 includes a panel body 61, and a shape of the panel body 61 is roughly the same as that of the cell body 11. The panel body 61 is provided with an opening 62 at a location close to an end of the tab, and the end of the connection member 40 can extend through the opening 62. Further, the panel body 61 is provided with two openings 62, the end of the first connection member 41 extends through one opening 62, and the end of the second connection member 42 extends through the other opening 62.

In an implementation, the blocking panel 60 further includes a restraint member 63, and the restraint member 63 is provided at the opening 62 and configured to restrain the first connection member 41 and the second connection member 42, to prevent ends of the first connection member 41 and the second connection member 42 from shaking at the openings 62 during highly intensive vibration of the battery cell module 1 and affecting a connection to another structure. Further, the restraint member 63 is a restraint column.

It may be understood that, in another implementation, the restraint member 63 may also be a restraint bump, and when used to replace the restraint column, the restraint bump can also restrain locations of the first connection member 41 and the second connection member 42.

The panel body 61 is also provided with a through hole 64. After the connection portion 252 of the adapting member 25 extends along a surface of the battery cell 10 close to the blocking panel 60, the adapting end 251 can extend through the through hole 64. The first connection member 41 and the second connection member 42 extending through the through holes 62, and the adapting end 251 extending through the through hole 64 are connected to a circuit board 2 provided on the surface of the blocking panel 60.

Referring to FIG. 2, FIG. 3, and FIG. 5, a first insulation member 70 is provided in the first accommodating groove 34, and the first insulation member 70 is located between the fourth tab 15 and the sixth tab 17. That is, the first insulation member 70 can be provided between the connected tabs on the adjacent battery cells 10.

The second insulation member 71 is provided in the second accommodating groove 36, and the second insulation member 71 separates the unconnected second tab 13 and fourth tab 15 of the adjacent first battery cell A and second battery cell B, and may cooperate with the first barrier 32 to prevent the unconnected second tab 13 and fourth tab 15 from coming into contact.

A third insulation member 72 is provided between the adjacent battery cells 10, and the third insulation member 72 can deform after being pressed when the battery cells 10 expand, thereby preventing the battery cells 10 from pressing the housing. Specifically, the third insulation member 72 is provided between two adjacent cell bodies 11. Further, to better protect the battery cell module 1, an insulation member (not marked in the figure) is provided on each periphery of stacked battery cells 10. When collision occurs, the insulation member can serve as a buffer for the battery cells 10.

Further, an insulation plate 80 is provided on the third insulation member 72 between the blocking panel 60 and the battery cell 10, and the insulation plate 80 is located between the blocking panel 60 and the third insulation member 72. The adapting end 251 is fixed to the insulation plate 80 through adhesion, so that the end of the adapting member 25 is fixed, to avoid shaking.

In an implementation, the first insulation member 70, the second insulation member 71, the third insulation member 72, and the insulation member provided on the periphery of the stacked battery cells 10 are foam. It may be understood that, in another implementation, the first insulation member 70, the second insulation member 71, the third insulation member 72, and the insulation member may also be replaced with another structure with an equivalent usage or function.

Referring to FIG. 2 and FIG. 3 again, the battery cell module 1 further includes an adhesive 90. The adhesive 90 is provided on the periphery of the stacked battery cells 10, to protect the battery cells 10. In an implementation, the stacked battery cells 10 can be placed in an apparatus, the flowing adhesive 90 can be filled from the opening 62 of the blocking panel 60, and after the adhesive 90 is stabilized into a form, the battery cell 10 is extracted.

The first insulation member 70 and the second insulation member 71 are respectively provided in the first accommodating groove 34 and the second accommodating groove 36, and can be filled at a location at which the adhesive 90 originally needs to be filled, thereby reducing overall weight of the battery cell module 1.

In another implementation, a battery pack is further related (not shown in the figure). The battery pack includes a housing (not shown in the figure) and the battery cell module 1 in the foregoing implementation. The battery cell module 1 is accommodated in the housing, and the adhesive 90 is located between the battery cell 10 and the housing. The battery uses the foregoing battery cell module 1, and therefore has corresponding beneficial effects. Details are not described herein.

In conclusion, the battery cell module 1 provided in the implementations of this application can replace an adapting plate in the original module by using the collection member 20 and the bracket 30. The collection member 20 is connected to the tabs, which can effectively reduce a pulling force on the tab. The bracket 30 includes a first barrier 32, which can electrically separate the unconnected second tab 13 and fourth tab 15, to prevent the unconnected second tab 13 and fourth tab 15 from coming into contact and causing a short circuit. The battery cell module 1 is used in some smart home apparatuses, such as a robotic vacuum cleaner, a vacuum cleaner, and a circular saw cutting machine. Even when highly intensively vibrated, the unconnected second tab 13 and fourth tab 15 do not come into contact. Furthermore, the bracket 30 is light in weight and low in cost, so that weight of the battery cell module 1 is reduced, and cost required in the assembly process is reduced.

In addition, persons of ordinary skills in the art should recognize that the foregoing implementations are only intended to illustrate, but not to limit this application, and appropriate changes and modifications made to the foregoing embodiments without departing from the substantial spirit and scope of this application fall within the claimed scope of this application.

What is claimed is:

1. A battery cell module, comprising:
    a plurality of stacked battery cells, wherein each battery cell comprises tabs and a cell body; and
    a collection member connected to the tabs;
    wherein in two adjacent battery cells comprising a first battery cell and a second battery cell, the first battery cell comprises a first tab and a second tab, the second battery cell comprises a third tab and a fourth tab, and the first tab is connected to the third tab; and
    wherein, the battery cell module further comprises:
        a bracket comprising a fixing plate and a first barrier, the fixing plate having a first side and a second side opposite to the first side of the fixing plate in a first direction, wherein the first barrier is provided on the fixing plate, wherein the collection member is provided between the fixing plate and a first side of the plurality of stacked battery cells in the first direction;
        the first barrier is provided between the second tab of the first battery cell and the fourth tab of the second battery cell;
        the first barrier is disposed on the first side of the fixing plate; and
        a connection member, a first end of the connection member is connected to the plurality of stacked battery cells, a second end of the connection member extends along a surface of the fixing plate away from the collection member, and the fixing plate is provided with a groove for accommodating the collection member.
2. The battery cell module according to claim 1, wherein the bracket further comprises a second barrier provided on the fixing plate; the fixing plate, the first barrier, and the second barrier form a first accommodating groove;
    a third battery cell is provided on a side of the second battery cell, the third battery cell comprises a fifth tab and a sixth tab, the fourth tab is connected to the sixth tab, and the fifth tab extends in a direction away from the third tab; and
    the fourth tab and the sixth tab are accommodated in the first accommodating groove, and the fourth tab and the sixth tab are connected to the collection member.
3. The battery cell module according to claim 2, wherein a first insulation member is provided between the fourth tab and the sixth tab.
4. The battery cell module according to claim 2, wherein the bracket further comprises a third barrier provided on the fixing plate, the first barrier is located between the second barrier and the third barrier; the fixing plate, the third barrier, and the first barrier form a second accommodating groove, and a second insulation member is provided in the second accommodating groove.
5. The battery cell module according to claim 4, wherein at least one of the first barrier, the second barrier and the third barrier comprises an insulation structure.
6. The battery cell module according to claim 1, further comprising a blocking panel, the blocking panel is provided with an opening, and the second end of the collection member extends through the opening.
7. The battery cell module according to claim 6, wherein a restraint member is provided at an opening location, and the restraint member is configured to restrain the connection member.
8. The battery cell module according to claim 6, further comprising an adapting member, wherein the adapting member comprises a connection portion and an adapting end, an end of the connection portion is connected to the collection member, the other end of the connection portion is connected to the adapting end, the blocking panel is further provided with a through hole, and the adapting end extends through the through hole.
9. The battery cell module according to claim 8, wherein the adapting end comprises an electrical connector to connect to an external circuit board.
10. The battery cell module according to claim 8, wherein the collection member comprises a body portion and a collection plate provided on the body portion, the connection portion is perpendicular to the body portion, and the connection portion is provided along a surface of the cell body.
11. The battery cell module according to claim 1, further comprising a third insulation member, and the third insulation member is provided between adjacent battery cells.
12. The battery cell module according to claim 2, wherein the first tab, the fourth tab, and the fifth tab are positive tabs; the second tab, the third tab, and the sixth tab are negative tabs; and the plurality of battery cells are connected in series.
13. The battery cell module according to claim 1, wherein the first tab and the third tab are connected through welding, and the fourth tab and the sixth tab are connected through welding.
14. The battery cell module according to claim 1, wherein the bracket and the collection member are provided on a same side of each battery cell of the plurality of stacked battery cells, and the bracket is provided on a side of the collection member away from the each battery cell.
15. A battery pack, comprising the battery cell module according to claim 1 and a housing, and the battery cell module is accommodated in the housing.
16. A battery cell module, comprising:
    a plurality of stacked battery cells, each battery cell comprises a positive tab and negative tab;
    wherein two adjacent battery cells comprising a first battery cell and a second battery cell, the positive tab of the first battery cell connect to the negative tab of the second battery cell through welding, the negative tab of the first battery cell is away from the positive tab of the second battery cell; and wherein the battery cell module further comprises:
- a bracket comprises a fixing plate and a plurality of barriers, the fixing plate having a first side and a second side opposite to the first side of the fixing plate in a first direction, wherein the plurality of barriers are provided on the fixing plate, at least one barrier disposed between the negative tab of the first battery cell and the positive tab of the second battery cell, two adjacent barriers form an accommodating groove, wherein the plurality of barriers provided on the fixing plate are disposed on the first side of the fixing plate;
- an insulation member, disposed in the accommodating groove; and
- a connection member, a first end of the connection member is connected to the plurality of stacked battery cells, a second end of the connection member extends along a surface of the fixing plate away from the collection member, and the fixing plate is provided with a groove for accommodating the collection member.

17. The battery cell module according to claim 16, wherein the fixing plate and barriers are integrally formed from plastic.

18. The battery cell module according to claim 16, wherein the battery cell module further comprises a collection member, the tabs of the battery cell and the collection member are disposed on a same side of the fixing plate.

19. The battery cell module according to claim 16, wherein a plurality of barrier form multiple accommodating grooves, and tabs of the first battery cell and the second battery cell disposed in one accommodating groove.

\* \* \* \* \*